US010114864B1

(12) United States Patent
Torun (10) Patent No.: US 10,114,864 B1
(45) Date of Patent: Oct. 30, 2018

(54) LIST ELEMENT QUERY SUPPORT AND PROCESSING

(71) Applicant: Amazon Technologies, Inc., Seattle, WA (US)

(72) Inventor: Mustafa Ugur Torun, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 549 days.

(21) Appl. No.: 14/716,705

(22) Filed: May 19, 2015

(51) Int. Cl.
*G06F 17/30* (2006.01)

(52) U.S. Cl.
CPC .. *G06F 17/30463* (2013.01); *G06F 17/30365* (2013.01)

(58) Field of Classification Search
CPC ............... G06F 17/30463; G06F 17/30365
USPC ........................................................ 707/718
See application file for complete search history.

(56) References Cited

U.S. PATENT DOCUMENTS

| 5,819,251 | A | 10/1998 | Kremer et al. |
| 6,016,497 | A | 1/2000 | Suver |
| 6,073,129 | A | 6/2000 | Levine et al. |
| 6,601,058 | B2 * | 7/2003 | Forster ............. G06F 17/30286 707/2 |
| 6,711,563 | B1 | 3/2004 | Koskas |
| 6,968,330 | B2 | 11/2005 | Edwards et al. |

* cited by examiner

*Primary Examiner* — Chelcie Daye
(74) *Attorney, Agent, or Firm* — Robert C. Kowert; Meyertons, Hood, Kivlin, Kowert & Goetzel, P.C.

(57) ABSTRACT

A fast and efficient technique to query which records within a table include a list that includes a specified element, where the queried database does not directly support queries on list elements. To support an update, the technique maps individual elements in a list with unique operand values, such as prime numbers, and calculates a function value, such as multiplication, for the list using the unique operand values, where the function value is then associated with the list. To support a query, the technique uses a complementary function, such as a modulo operation, applied to a unique operand for a specified element and to a function value associated with a list to determine if the function value for the list was generated using the unique operand for the specified element.

20 Claims, 6 Drawing Sheets

TABLE 302

| KEY (Attribute 306) | LIST (Attribute 308) | MEMBERSHIP VALUE (Attribute 310) |
|---|---|---|
| $rule_1$ | $\{event_{231}, event_{729}, \ldots event_9, event_{201}, event_{449}\}$ | $f_M(p_{231}, p_{729}, \ldots p_9, p_{201}, p_{449}) = M_1$ |
| $rule_2$ | $\{event_{33}, event_{555}, \ldots event_{198}, event_{92}, event_{271}\}$ | $f_M(p_{33}, p_{555}, \ldots p_{198}, p_{92}, p_{271}) = M_2$ |
| $rule_3$ | $\{event_2, event_{79}, \ldots event_{159}, event_{90}, event_{21}\}$ | $f_M(p_2, p_{79}, \ldots p_{159}, p_{90}, p_{21}) = M_3$ |
| $\ldots$ | $\ldots$ | $\ldots$ |
| $rule_m$ | $\{event_x, event_y, event_z\}$ | $f_M(p_x, p_y, p_z) = M_m$ |

KEY 316 — LIST 318 — MEMBERSHIP VALUE 320

MAPPING INDEX 304

| LIST ELEMENT (Attribute 312) | OPERAND (Attribute 314) |
|---|---|
| $event_1$ | $p_1$ |
| $\ldots$ | $\ldots$ |
| $event_x$ | $p_x$ |
| $event_y$ | $p_y$ |
| $event_z$ | $p_z$ |
| $\ldots$ | $\ldots$ |
| $event_n$ | $p_n$ |

LIST ELEMENTS 322 — OPERANDS 324

LIST ELEMENT QUERY SUPPORT AND PROCESSING

BACKGROUND

Different types of database systems have different advantages and disadvantages. For example, traditional relational databases are based on relational models of data and support different types of complex queries, but may suffer from a lack of horizontal scaling. By contrast, non-relational or NoSQL databases may better support horizontal scaling, but may provide a user with fewer options in specifying a query of a given table. Further, a commonly stored attribute within a record of a table is a list of elements, and for a database that does not support direct queries on lists of elements, it may be extremely inefficient and cumbersome to obtain an answer regarding membership of list elements in a list.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean inclusive of, but not limited to.

DETAILED DESCRIPTION

The systems and techniques described in this disclosure specify implementations of a look-up component for an efficient determination of whether a list of elements includes a particular list element and for creating and maintaining a computing architecture for supporting such membership determinations. In some implementations, the look-up component is included within a database engine to provide additional flexibility in querying for which records in a table may includes lists that include a particular list element. In other implementations, the look-up component may be included in a processing layer on a client computing device using a database system that does not support direct queries on list elements of a given record in a table. Generally, the look-up component may provide a constant value order of complexity for determining whether or not a particular element is a member of a given list of elements, regardless of the quantity of elements in a list, and without individual comparison of element values.

For context, in traditional methods, for any given list of unsorted elements, a determination of whether a given element is a member of the list may require up to n comparisons, where n is the number of elements in the list. By contrast, given the computing infrastructure created for a given list by the look-up component, the disclosed look-up component may determine membership of a given element within a list of elements with a single operation computation.

In one implementation, for a list of n elements, $\{l_1, \ldots l_n\}$, the look-up component may generate and map a unique operand to each of the elements in the list, where a set of unique operands may be $\{p_1, \ldots p_n\}$. The mapping of respective unique operands to respective elements of a list may be done as each element is added to a list, and mapping information for each of the elements may be stored in an index of mappings. Collectively, each of the unique operands that are mapped to respective elements of a list may be considered an operand set for the list. A given operand may be considered to be unique if no other operand in an operand set is equal to or equivalent to the given operand.

Further, the look-up component may maintain a value for the list, a membership value, where the membership value for the list is a result of applying a membership function to each of the unique operands of the operand set for the list such that a complementary function applied to both the membership value and to a given operand indicates whether the given operand is included in the operand set for the list—thereby indicating that an element mapped to the given operand is included in the list.

For example, in a list of three elements, $\{l_1, l_2, l_3\}$, where $l_1$ is mapped to $p_1$, $l_2$ is mapped to $p_2$, and $l_3$ is mapped to $p_3$, an operand set for this list may be $\{p_1, p_2, p_3\}$, and a membership function value may be M, where the membership function is $f_M(p_1, p_2, p_3)$. In this example, to determine whether or not a given element e is a member of the list, and without individually analyzing or comparing e with individual members of the list, the look-up component may determine membership of e. In some cases, to determine the unique operand mapped to e, the look-up component may reference an index of mappings between elements and unique operands.

Continuing this example, referencing the mapping index, the look-up component may determine that element e is mapped to unique operand u. At this point, the look-up component has determined unique operand u for the element e and membership value M for the list of elements. The look-up component may now apply a complementary function, $f_C(\ )$ to M and u, to generate $f_C(M, u)=C$—where the value of C indicates whether or not u is in the operand set, $\{p_1, p_2, p_3\}$, which is the operand set used in generating membership value M for the list using membership function $f_M(p_1, p_2, p_3)$. In this way, with a single operation, if u is determined to be in the operand set of the list, $\{p_1, p_2, p_3\}$, then element e, which is mapped to p, may be determined to be a member of the list of elements $\{l_1, l_2, l_3\}$.

This example provides a general outline of an look-up component using (1) an operand set of unique operands mapped to respective members of a list, (2) a function applied to an operand set to generate a membership value for the list, and (3) a complementary function applied to a membership value for a list and to a given unique operand mapped to a given element to determine whether or not the given unique operand is included in the operand set for the membership value of the list. Below, additional examples are provided with regard to FIGS. 1-5.

In general, the advantages in the reduction of computational operations and minimal storage requirements of using the look-up component and look-up component architecture become more prominent when large numbers of list elements are considered, and when large numbers of lists are considered. In short, in data stores or data storage systems that do not support direct queries on individual elements of lists within records, the look-up component may provide a computationally efficient and space efficient solution. Otherwise, in systems without support of direct queries on individual elements of a list, a user may be able to find a particular record, but the system may not support a query such as "give me all records that include lists that include a specific element."

In some embodiments, the look-up component may implement a membership function to be a multiplication operation, the unique operands to be unique prime numbers, and a complementary function to be a modulo operation. However, in different cases, other functions and mappings with the properties described herein may be used.

In this example, a record in a table in a NoSQL database may include a list of elements, such as $\{l_1, l_2, l_3\}$, where $l_1$ is mapped to unique prime number 2, $l_2$ is mapped to unique prime number 3, and $l_3$ is mapped to unique prime number 5, an operand set for this list may correspondingly be $\{2, 3, 5\}$, and a membership value may be $30=f_M(2, 3, 5)=2\times3\times5$—where the membership function is multiplication.

In this example, the look-up component may receive and process a query directed at the record in the table that includes the list, where the query specifies whether an element, such as element$_3$ is included in a specified record in a table. In other cases, a different query may also request all of the records in the table that include a respective list that includes a specified element.

To continue this example, where the query is for whether a specified record includes a list that includes a specified element, and in response to receiving the query, the look-up component may determine a unique operand for the specified element. In this case, the specified element is $l_3$, and the look-up component may determine, based on a stored index of mappings, that $l_3$ is mapped to unique prime number 5.

In processing the query in this example, the look-up component may also determine the membership value for the list, which may be stored in a membership value attribute for the specified record. In this example, the membership value for the specified record is 30 because the operand set is $\{2, 3, 5\}$ and the membership function is multiplication. Given the membership value of 30 and the unique prime number of 5 mapped to specified element, $l_3$, the look-up component may apply the complementary function, $f_C( )$ which in this case is a modulo function to generate: modulo (30, 5)=0.

In other words, modulo(30, 5) generates 0 (zero) because there is no remainder after dividing 30 by 5 due to 5 being one of the factors of membership value 30 due to 5 being one of the unique prime numbers of operand set $\{2, 3, 5\}$ used in the membership function, which in this case is a multiplication function that generated the membership value for the list to be 2×3×5=30.

To complete this example, given that the look-up component determined that the unique prime number mapped to the specified element, element$_3$, was used in generating the membership value for the list of the specified record, the look-up component may determine that element$_3$ is included in the list of the specified record—and the look-up component may return respond to the query with a positive indication that element$_3$ is included in the list of the specified record.

Figure 1:
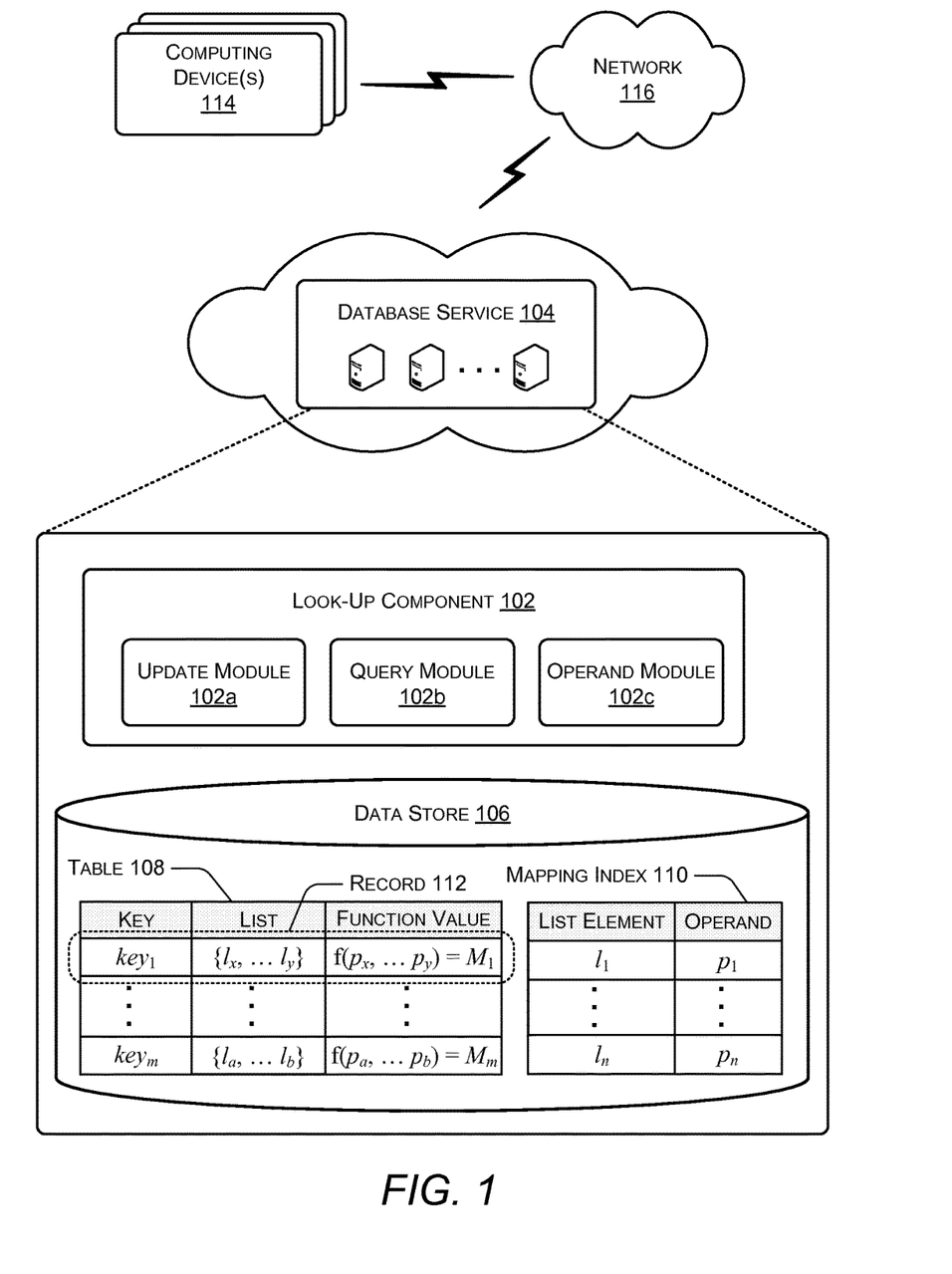
FIG. 1 is a first illustrative architecture depicting an example look-up component for supporting and processing queries.

FIG. 1 illustrates an example computing environment and system that includes an example embodiment of a look-up component, look-up component 102. In this example, look-up component 102 includes an update module 102a and a query module 102b. In some embodiments, look-up component 102 may also include an operand module, such as operand module 102c, for managing mappings between unique operands and individual elements. For example, in response to a user inserting an element into a list, look-up component 102 may determine a unique operand mapped to the element to be inserted by using operand module 102c to generate a unique operand, based on whether the element to be inserted is already present within a mapping index and mapped to a unique operand or, if not in the mapping index, generating a new unique operand to be mapped to the element to be inserted. In the case that look-up component 102 receives a deletion command of an element from a list, the operand module 102c may determine whether the unique operand mapped to the element to be deleted may be reused, or recycled. For example, in response to each update command, operand module 102c may update a counter to keep track of whether the element mapped to a unique operand is present within any lists. In some cases the mapping index may include an additional attribute in which to store a counter reflective of a number of lists within which the element is a member. For example, in response to an insertion of an element into a list, the operand module 102c may increment the counter for the mapping index record for the element inserted, and similarly, in response to a deletion of an element from a list, the operand module 102c may decrement the counter for the mapping index record for the element deleted. In this example, if the counter reaches zero after a deletion, then the operand module 102c may determine that the unique operand mapped to the element may be reused or recycled. In other implementations, operand module 102c may keep all mappings, and generate a new unique number as needed. For example, in the case that the unique operands are prime numbers, a new unique prime number may be generated each time an element is not found to be within the mapping index and a unique operand is requested. Further in the case that the unique operands are prime numbers, operand module 102c may access a table storing prime numbers each time a new unique number is to be generated or the operand module 102c may communicate with another software service to request successive prime numbers. Further in this example, look-up component 102 may be included within a database service, such as database service 104, which may be a NoSQL database, and which may include a data store, data store 106. Data store 106 may include one or more tables, including table 108, where table 108 may include multiple records. Data store 106 may also include a mapping index, mapping index 110. In this example, mapping index 110 is not maintained, or in some cases, accessible, by computing devices 114.

In some embodiments, a look-up component may be implemented within other types of data stores instead of within a NoSQL database service as depicted in FIG. 1, including, but not limited to, a traditional, relational database, a non-relational database, a file system, or a generic, unstructured, data store storing lists that may be searched.

In some embodiments, look-up component 102 may be implemented as a processing layer on top of a database engine that does not support direct queries on list elements in a record. In this way, while the underlying database engine continues to not support direct queries on list elements in a record, the database engine in combination with the look-up component 102 processing layer, may provide the functionality to a client device of support of direct queries on list elements of a record. In short, with less software development effort than modifying an entire database engine, and in a cost-effective manner, look-up component 102 may be used as a processing layer on top of a database engine to increase the functionality of a database that is not designed to support direct queries on list elements. In other words, the functionality of look-up component 102 may be added as a processing layer on top of a database without modifying the database engine. In other embodiments, the functionality of look-up component 108 may be integrated into a database engine and may serve as a basis for the database engine providing direct queries on list elements in a record.

As depicted in FIG. 1, table 108 of data store 106 may be organized according to a schema specifying three attributes for table 108, a "key" attribute for storing a key value for records of table 108, a "list" attribute for storing lists of elements, and a "function value" attribute for storing function values, such as membership values. For example, as depicted, a record, record 112, for key value="key$_1$," may include a list="{l$_x$, . . . l$_y$}" and include a membership value f(p$_x$, . . . p$_y$)="M$_1$," where record 112 may be one of multiple records of table 108. Further in this example, the list elements may be {l$_x$, . . . l$_y$}, the unique operands in the operand set for the list of elements may be {p$_x$, . . . p$_y$}, and the mappings between the list elements and the unique operands may be stored in mapping index 110. In other embodiments, data store 106 does not store a schema that includes an index of individual elements of the lists of the records.

In some examples, mapping index 110 may be an internally maintained table that may not be visible or accessible to client devices. Further, in some cases, mapping index 110 may use a "list element" value as a key value, and a unique operand attribute for storing a mapping value for a given key value, where a given key value may be a given list element. In general, a mapping index may be stored in any type of data structure that store associations or mappings between one or more index values and respective one or more values.

Further in this example, the depicted computing environment may include one or more computing devices 114 that may communicate with database service 104 across network 116.

Figure 3:
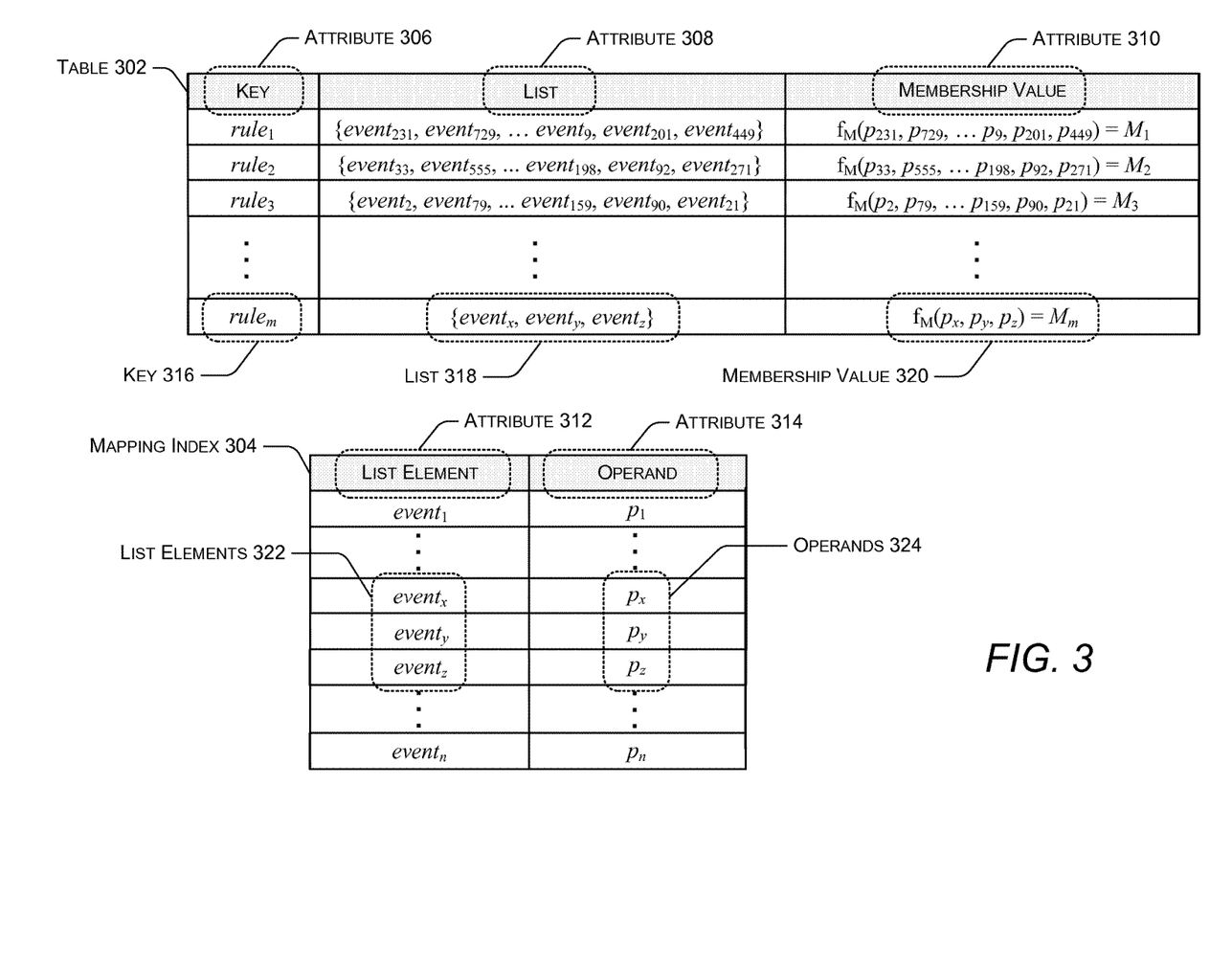
FIG. 3 illustrates an example table and index for a look-up component to support and process queries according to some implementations.
Figure 4:
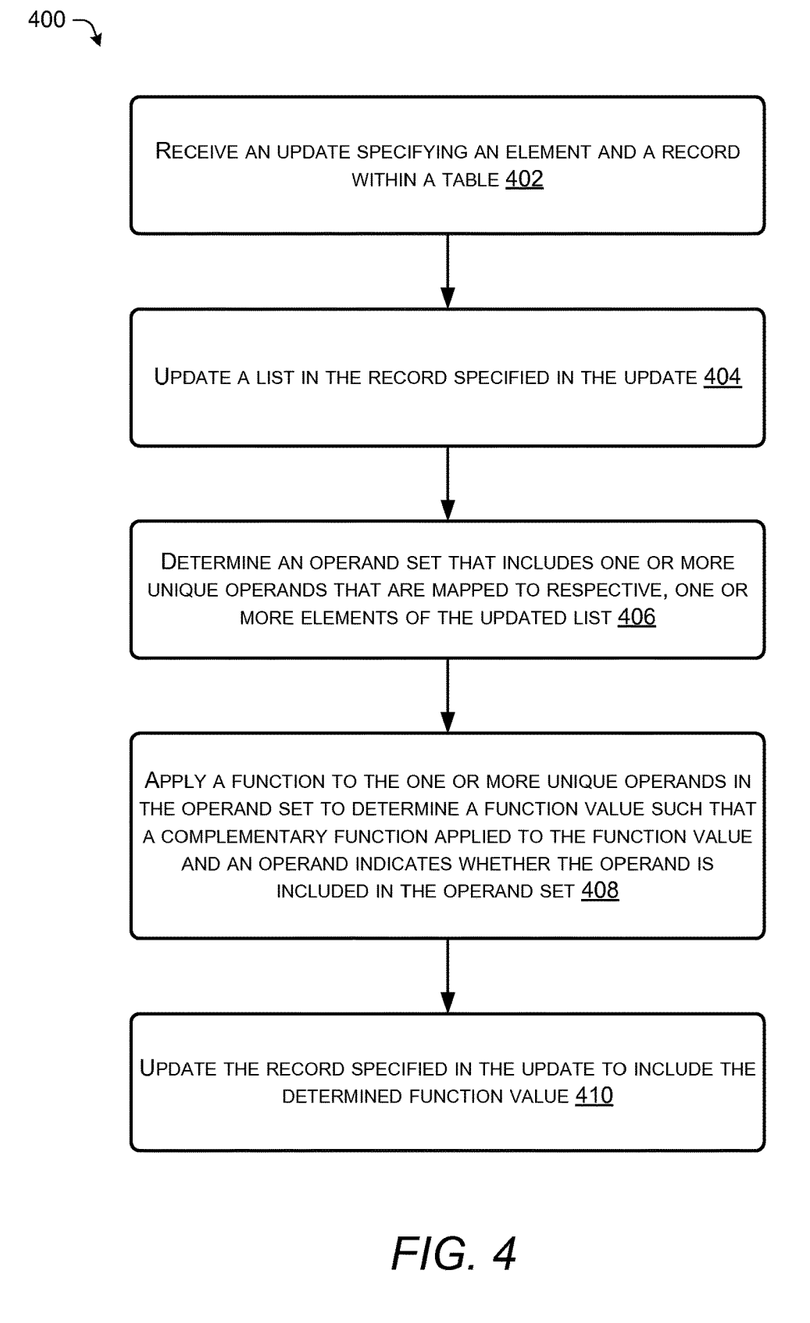
FIG. 4 is a flow diagram illustrating features of a look-up component updating a table and mapping index according to some implementations.
Figure 5:
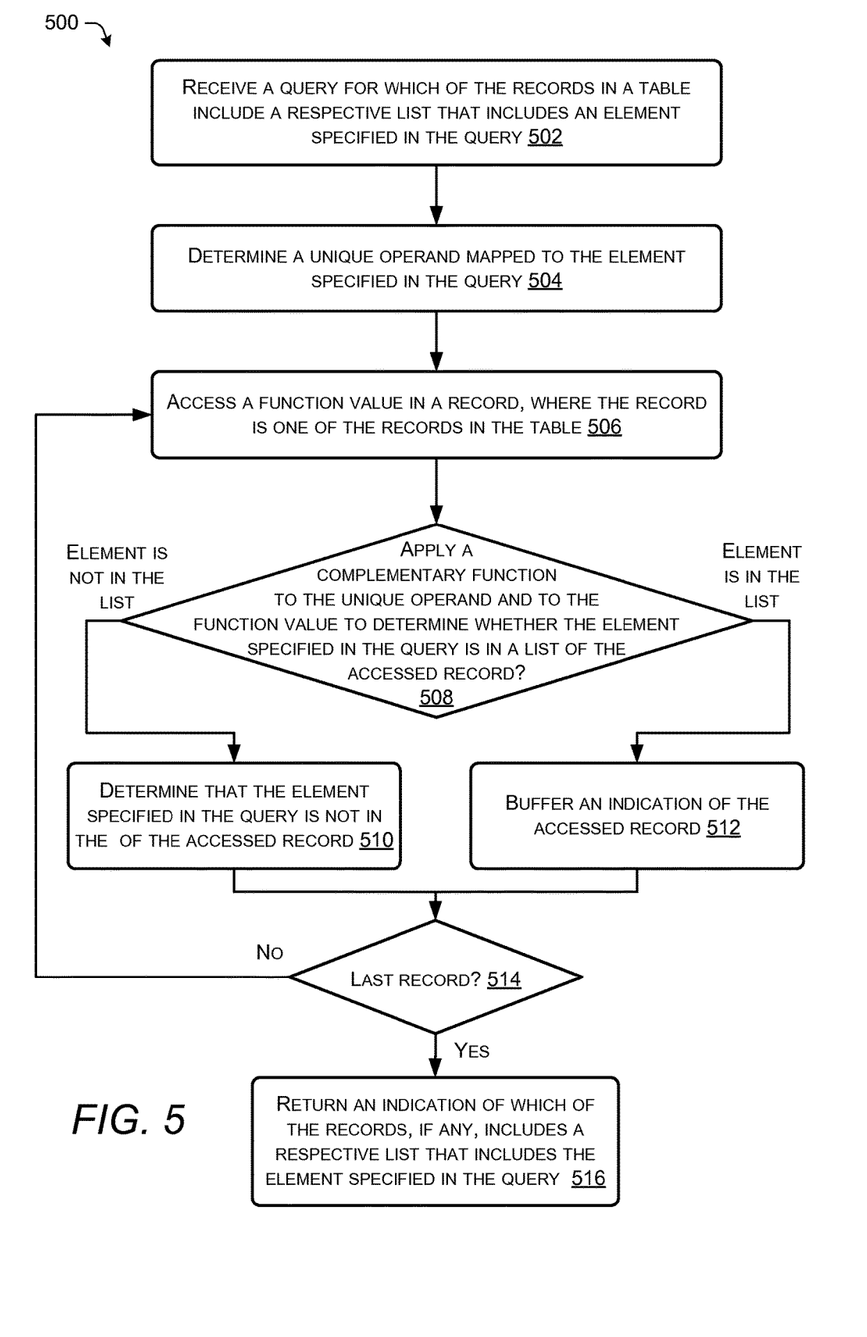
FIG. 5 is a flow diagram illustrating features of a look-up component processing a query according to some implementations.

Given this example computing environment, and as described in greater detail with regard to FIGS. 3-5, a user, from a client device 114, may create and update records of table 108, including creating and updating lists of elements within table 108. As look-up component 102 processes each creation of a list or update to a list, look-up component 102 may maintain membership values within a membership value attribute for each record and may maintain a mapping index.

In this way, look-up component 102 may, in a computationally- and space-efficient manner, process queries directed to lists of elements within records regarding whether or not a particular element is a member of a particular list, and queries directed to a table regarding which records of a table include lists that include a particular element as a member.

Further, in some embodiments, database clients may encompass any type of client configurable to submit web services requests to non-relational or NoSQL database service 104, such as application providers or application clients. For example, a given database client, such a client from among computing devices 114, may include a suitable version of a web browser, or a plug-in module or other type of code module configured to execute as an extension to or within an execution environment provided by a web browser to provide database or data storage service clients (e.g., client applications, users, and/or subscribers) access to the services provided by database service 104. Alternatively, a database client may encompass an application such as a database application, media application, office application or any other application that may make use of persistent storage resources (such as application providers and application clients).

For example, a database client may be configured to implement applications that may include sufficient protocol support (e.g., for a suitable version of Hypertext Transfer Protocol (HTTP)) for generating and processing web services requests without necessarily implementing full browser support for all types of web-based data. That is, database client may implement an application configured to interact directly with database service 104.

Further, database service 104 may be configured to implement one or more service endpoints configured to receive and process web services requests, such as queries and requests to access tables maintained on behalf of application providers and application clients by a database service or a data storage service, and/or the items and attributes stored in those tables. For example, database service 104 may include hardware and/or software configured to implement various service endpoints and to properly receive and process HTTP-based web services requests directed to those endpoints. In one embodiment, database service 104 may be implemented as a server system configured to receive web services requests from clients and to forward them to various components that collectively implement a database system for processing. In other embodiments, database service 104 may be configured as a number of distinct systems (e.g., in a cluster topology) implementing load balancing and other request management features configured to dynamically manage large-scale web services request processing loads.

Figure 2:
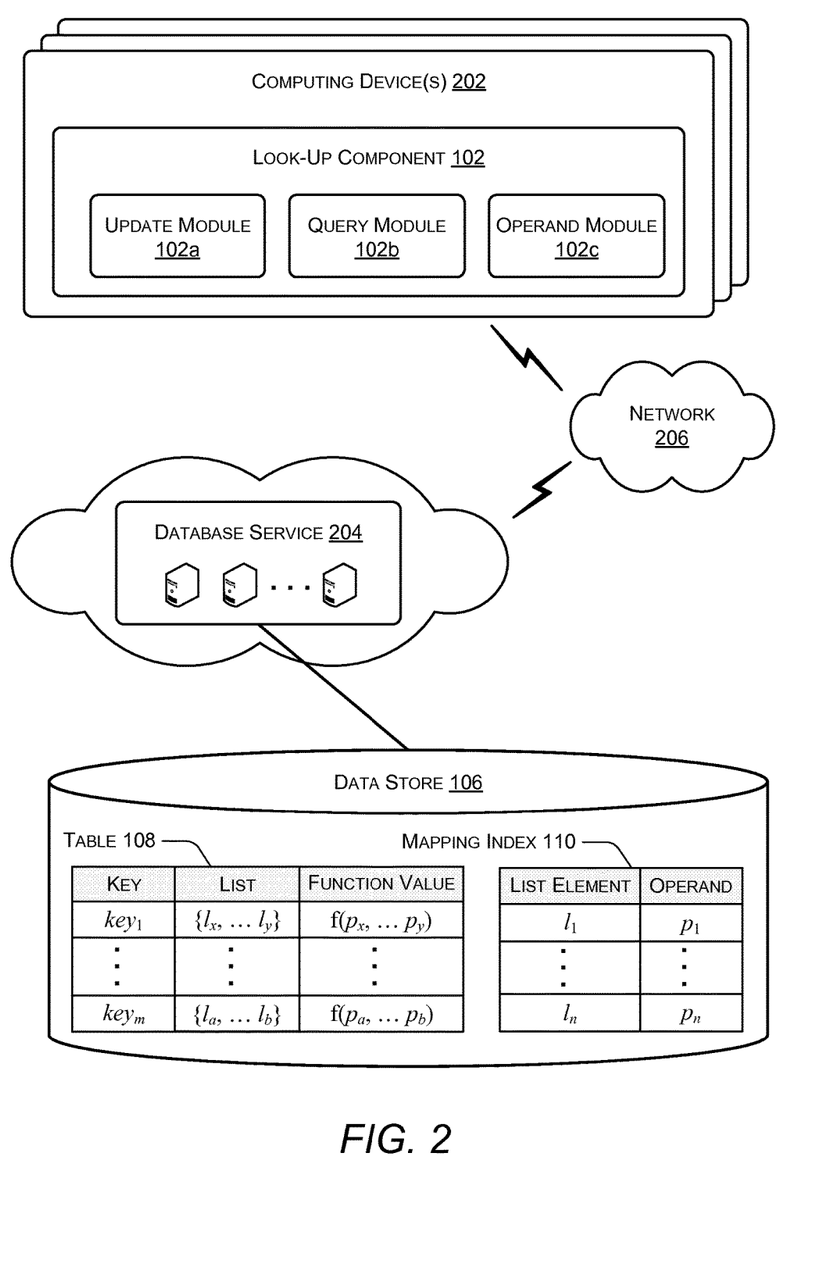
FIG. 2 is a second illustrative architecture depicting an example look-up component for supporting and processing queries.

FIG. 2 illustrates an example computing environment and system that includes an example embodiment of a look-up component, look-up component 102. In this example, look-up component 102 includes an update module 102a and a query module 102b. Further in this example, look-up component 102 may be included within one or more client computing devices, such as client computing device(s) 202, which may be a desktop computer, a mobile computing device, or any other type of computing device.

In this embodiment, look-up component 102 may be implemented within an application, through a web portal, or as a script, plugin, or component of an application or web page. In general, where look-up component 102 is implemented on a client device, look-up component 102 may receive updates and queries and perform the creation and maintenance of the computational infrastructure for supporting queries with regard to membership of an element within a list of elements or queries regarding which records from among multiple records in a table include lists such that the lists include a specific element, as described above with regard to FIG. 1.

For example, as discussed with regard to FIG. 1, the look-up component 102 on client device(s) 202 may generate and maintain membership function values within each record of table 108, and look-up component 102 may also maintain mapping index 110 for storing mapping information between individual elements and individual unique operands. In this embodiment, table 108 and mapping index 110 may be stored within data store 106. As depicted in this implementation, data store 106 may be remotely accessible storage. However, in other cases, data store 106 may be implemented as part of database service 204.

Further in this embodiment, in the case where the query or update is unrelated to querying or updating elements of a list, then look-up component 102 may simply forward the query or update to database service 204 across network 206 without additional processing.

In short, in this embodiment, a database may appear to provide direct support for queries on list elements without the database or database engine being modified at all. In this way, a user may have all the functionality of look-up component 102 available on a client device without being aware that the functionality is provided on the client side instead of the database side. In other embodiments, a user may directly update an application on a client device for accessing a database such that the update installs, within the application, an implementation of look-up component 102, and as a result, the user would be responsible for, and aware of, the added processing layer and functionality provided by look-up component 102.

FIG. 3 illustrates an example schema within a data store that may be used in a computing environment in which a rule-processing system provides multiple rules for handling data, and where a given rule or rules may be triggered by one or more events. For context, this example is described with regard to the computing environment described in FIG. 1, where table 302 and mapping index 304 may be stored within data store 106, and an implementation of a look-up component is look-up component 102 within data service 104.

In this example, a user or administrator may specify one or more events that may trigger the execution of one or more rules. For example, as depicted in FIG. 3, a rule may serve as a key value attribute for a table, "KEY", depicted as attribute 306 of table 302, where table 302 further includes an attribute for a "LIST", depicted as attribute 308, and an attribute for a "MEMBERSHIP VALUE", depicted as attribute 310. For example, key 316 corresponds to a record with key value "rule$_m$", list 318 of the record corresponds to list "{event$_x$, event$_y$, event$_z$}", and membership value 320 of the record corresponds to membership function value $f_M(p_x, p_y, p_z)$="M$_m$".

Further in this example, look-up component 102 may maintain mapping index 304, where mapping index 304 is stored as a table within data store 106, and where mapping index 304 includes a key value of "LIST ELEMENT", depicted as attribute 312, and include an attribute for an "OPERAND", depicted as attribute 314. As discussed with regard to FIG. 1, a mapping index stores mappings between individual list elements and respective, individual, unique operands. For example, list elements 322 of mapping index 304 are event$_x$, event$_y$, and event$_z$, which are mapped, respectively, to unique operands $p_x$, $p_y$, and $p_z$.

As depicted in table 302, there may be a large number of rules, and for each of the rules, there may be a large number of events that may trigger a particular rule. In some cases, a single event may trigger multiple different rules, and a user or system may wish to know which of the rules are triggered by a given event. In examples such as this, were there are large numbers of lists, where the lists in turn may include large numbers of elements, and for a database that does not support direct queries on list elements, a search of individual list elements would be inefficient and time-consuming.

However, given that look-up component 102 maintains a respective membership value for each of the respective lists for each of the respective records, look-up component 102 may, for a given record and with a single application of a complementary function to a particular membership value of the given record and a unique operand mapped to a particular specified element, determine whether or not the unique operand was used in generating the membership value, and therefore, whether or not the specified element is included in the particular list.

In this way, when the rule-processing system receives or detects an event, the system may, with a small and constant number of operations, determine which of the rules in the table need to be applied. For example, in response to detecting or receiving an event, such as event$_x$, the rule-processing system may generate a query for the database specifying an indication of event$_x$, specifying an indication of the table of rules, table 302, and requesting all rules that may be triggered by event$_x$.

To satisfy this query, look-up component 102 may iterate through the membership values for each of the records in table 302, where each record corresponds to a rule, and where look-up component 102 applies the complementary function to a given membership value of the given record and a unique operand mapped to a specified element. As described above, for a given record of the table, if look-up component 102 determines that the unique operand was used in generating the membership value of the given record, then in response to this determination, look-up component 102 may determine that event$_x$ is included in the list of elements representing events which trigger the rule for the given record.

In this way, after considering each of the records, look-up component 102 may respond to the query with all of the rules that include lists of events that include the event specified in the query. Given this query response, the rule-processing system may then know which rules are triggered by event$_x$, and may proceed to respond accordingly.

In general, look-up component 102 may implement the functionality for processing queries directed to membership of specific elements within a list of elements, regardless of the type of the elements or the size of the list or the number of lists. In other words, look-up component 102 is element type agnostic at least because look-up component 102 does not perform any direct comparison between values or contents of elements. Further, given that look-up component 102 does not analyze or compare contents or values of elements, the elements themselves may be any type of representation of data, and in some cases, a type of data object. Further still, look-up component 102 may generate, access, or otherwise determine an unlimited number of additional, unique operands as lists are updated and new list elements are added and mapped to unique operands. For example, in the case that unique operands are prime numbers, there are an infinite number of prime numbers.

FIG. 4 illustrates a flowchart depicting at least some of the processing features of look-up component 102 with regard to performing an update to a list of elements. In this example, the processing features depicted in this flowchart are discussed in the context of the computing environment and database described with regard to FIG. 1 and table 302 and mapping index 304 as depicted in FIG. 3. However, this context is simply for the purposes of explanation and in different embodiments, other examples are possible and the look-up component 102 is not restricted to any particular schemas, attributes, element values, or attribute values. In other words, look-up component 102 may generally be applied to any generic list of elements and to any generic type of list element.

As depicted in FIGS. 1 and 3, a data store 106 may store a table of records, table 302, where table 302 includes attributes for "KEY", "LIST", and "MEMBERSHIP VALUE". Further in this example, the "KEY" attribute provides for key values for indexing a specific record, the "LIST" attribute provides for lists of elements, and the "MEMBERSHIP VALUE" attribute provides for values generated from applying a membership function to an operand set, where the operand set includes one or more unique operands that are mapped, respectively, to one or more of the elements of a respective list. In this example, the record for key value attribute "$rule_m$." includes list "$\{event_x, event_y, event_z\}$", and membership function value $f_M(p_x\ p_y, p_z)$="$M_m$".

Given this example setup, look-up component 102 may receive an update command, where the update command specifies an element and specifies a key value for identifying a particular record, as depicted at 402. In this example, the record indexed by the specified key value may include the list of elements to update according to the update command.

In response to receiving the update command, look-up component 102 may update the list according to the update command, as depicted at 404. The update command may indicate insertion of at least one element into a list of the record, or the update command may indicate deletion of at least one element from a list of the record.

For either an insertion or deletion, the list of elements of the record will include a different set of elements after an update—aside from the cases of inserting an existing element or deleting a non-existing member. Therefore, to keep the membership function value for a record accurately reflective of the elements included in the list, look-up component 102 also updates the membership function value according to the unique operands respectively mapped to the current elements of the list. As depicted at 406, look-up component 102 determines an operand set that includes one or more unique operands mapped to respective, one or more elements of the updated list.

For example, for an insert update command, and specified element $event_{new}$ into the list of the record with specified key value "$rule_m$", look-up component 102 may determine mapping data for element $event_{new}$ to be unique operand $p_{new}$, and determine an operand set to be $\{p_x\ p_y, p_z, p_{new}\}$. Having determined the operand set, look-up component 102 may apply a membership function to the unique operands in the operand set to determine a membership function value such that a complementary function applied to the membership function value and a given operand may indicate whether the given operand is included in the operand set, as depicted at 408.

Given the generated membership function value corresponding to the updated list, look-up component 102 may then update the membership function value of the record with specified key value "$rule_m$" to be reflective of the updated list of elements.

For example, given the original list from table 302, and in response to insertion of element $event_{new}$ into the list of the record with key value "$rule_m$", and given a membership function to be multiplication, then the updated membership function value may be determined to be $f_M(p_x,\ p_y,\ p_z, p_{new})=p_x \times p_y \times p_z \times p_{new}$="$M_{new}$", where $\{p_x, p_y, p_z, p_{new}\}$ may be the determined operand set depicted at 406, and where the application of the function depicted in 408 is multiplication.

For example, given the original list from table 302, and in response to a deletion of element $p_x$ from the list of the record with key value "$rule_m$", and given a membership function to be multiplication, then the updated membership function value may be determined to be $f_M(p_y,\ p_z)=p_y \times p_z$="$M_{new}$", where $\{p_y, p_z\}$ may be the determined operand set depicted at 406, and where the application of the function depicted at 408 is multiplication.

While in this example, for clarity, the operand set is conceptually used as representing the set of unique operands mapped to the elements of a list, in general, a function may be applied without determining individual operands in an operand set. Instead, look-up component 102 may, depending on an insertion or deletion of an element, apply a function to the current membership function value and the unique operand mapped to the specified element, and update the membership function value according to the result of this function application.

For example, if a list has two elements mapped respectively, to unique operands 3 and 5, and the membership function is multiplication, and the membership function value is 15, corresponding to 3×5, then to determine a new membership function value upon an insertion of an element mapped to 7, then the updated membership function value may be determined to be the current membership function value of 15×7=95, without individually determining operands for the existing element members. Similarly, for a deletion of the element mapped to 3 in the list, look-up component 102 may, without determining an operand set for individual operands for the list members, may determine an updated membership function value of 15/3=5.

FIG. 5 illustrates a flowchart depicting at least some of the processing features of look-up component 102 with regard to performing a query directed to one or more lists of elements within one or more records. In this example, the processing features depicted in this flowchart are discussed in the context of the computing environment and database described with regard to FIG. 1 and table 302 and mapping index 304 depicted in FIG. 3. However, this context is simply for the purposes of explanation and in different embodiments, other examples are possible and the look-up component 102 is not restricted to any particular schemas, attributes, element values, or attribute values. In other words, look-up component 102 may generally be applied to any generic list of elements and to any generic type of list element.

As depicted in FIGS. 1 and 3, a data store 106 may store a table of records, table 302, where table 302 includes attributes for "KEY", "LIST", and "MEMBERSHIP VALUE". Further in this example, the "KEY" attribute provides for key values for indexing a specific record, the "LIST" attribute provides for lists of elements, and the "MEMBERSHIP VALUE" attribute provides for values generated from applying a membership function to an operand set, where the operand set includes one or more unique operands that are mapped, respectively, to one or more of the elements of a respective list.

In some examples, a query may specify an element and also specify a key value for identifying a single, particular record, and the query response would indicate whether the specified element is included in the list of elements for the record indexed according to the specified key value. In such a case, for example, given a query as to whether the record for key value attribute "$rule_m$" includes a list that includes a specified element "$event_x$", look-up component 102 may access the membership value for the record, "$M_m$", and apply a complementary function to determine if a unique operand mapped to "$rule_m$" is an operand used in generating "$M_m$". The query response would then indicate whether the specified element is in a list of the specified record.

However, for other examples, and as depicted in the flowchart of FIG. 5, look-up component 102 may receive a query for which of the records in a table include a respective list that includes an element specified in the query, as depicted at 502. In other words, the query is requesting all records in the specified table that include a list that includes a specified element.

Given the specified element, say $event_q$, look-up component 102 may access mapping index 304 to determine a unique operand, $p_q$, mapped to $event_q$, as depicted at 504. At this point, look-up component 102 may iterate over each of the records in the table. In some cases, each record may be accessed individually during the iterations, and in other cases, all of the records in the table may be requested before the iterations begin.

As depicted at 506, look-up component 102 may access a given record of the one or more records in the table. Having determined the unique operand mapped to the specified element, $event_q$, look-up component 102 may access the membership value for the current, given record, which may be, say, $M_{current}$. Having determined $p_q$ and $M_{current}$, look-up component 102 may apply a complementary function to the unique operand, $p_q$, and to the membership value, $M_{current}$ to determine whether element $event_q$, specified in the query, is in the list of elements in the current, given record, as depicted at 508.

If look-up component 102 determines that $p_q$ is a unique operand used by the membership function to generate $M_{current}$, then look-up component 102 may determine that specified element $event_q$ is a member of the list of elements for the current, given record, and may store an indication of the current, given record, and may proceed to determine whether the last record has been considered, as depicted at 512.

Otherwise, if look-up component 102 determines that $p_q$ is not a unique operand used by the membership function to generate $M_{current}$, then look-up component 102 may determine that specified element $event_q$ is not a member of the list of elements for the current, given record, and may proceed to determine whether the last record has been considered, as depicted at 514.

If the last record has been considered, look-up component 102 may, in response, return an response to the query indicating, based on the stored indications, which of the records of the table, if any, include a respective list that includes the element specified in the query, as depicted at 516.

Otherwise, if the last record has not been considered, look-up component 102 may iterate, and, as depicted at 506, access a next record to be considered a currently accessed record, and look-up component 102 may again access a membership function value from the current, given record, and continue until the last record in the table has been considered.

In this way, in this example, a query regarding which records of a table include a list that includes a specified element, look-up component 102 may quickly, and efficiently, determine one or more records that satisfy the query.

Figure 6:
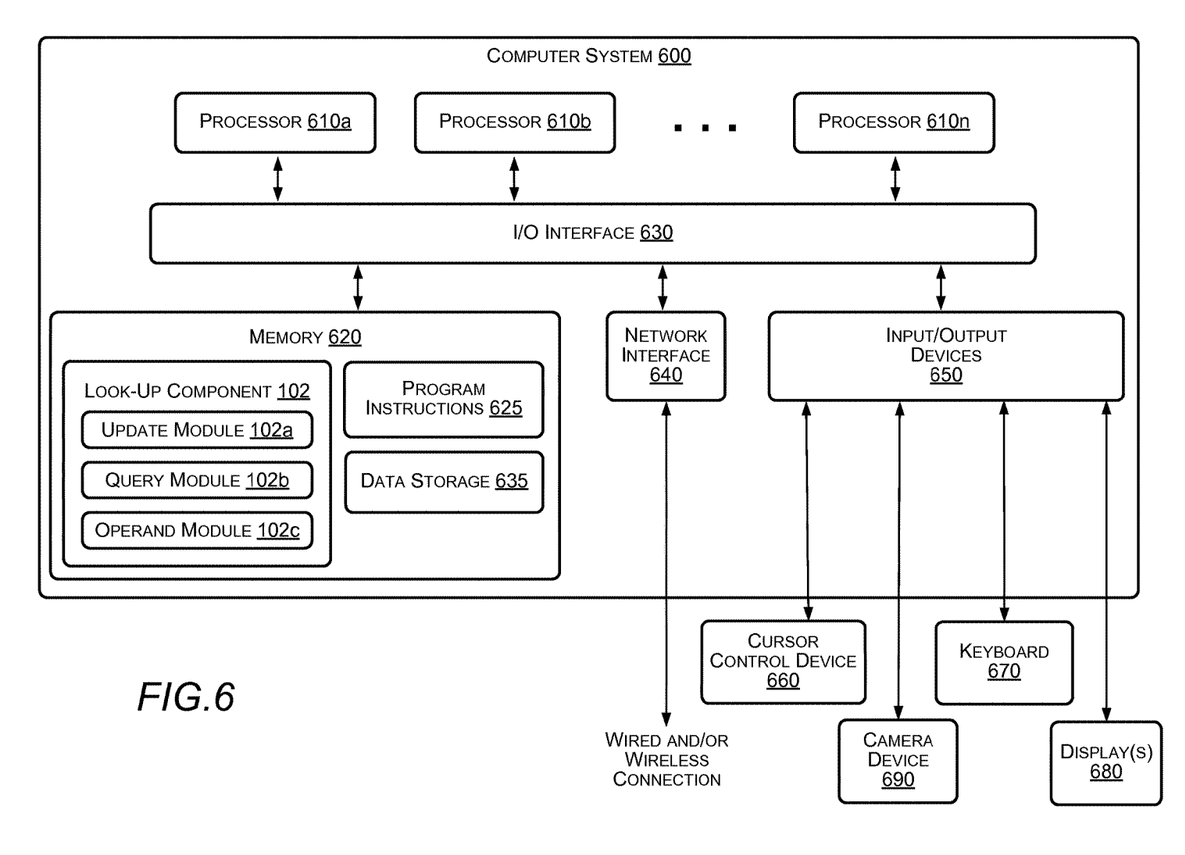
FIG. 6 illustrates a computer system and components of a look-up component according to some implementations.

FIG. 6 illustrates an example computer system, computer system 600, where computer system 600 may be configured to implement a look-up component according to the discussed embodiments and examples. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device. Generally, the methods described herein may in various embodiments be implemented by any combination of hardware and software.

Further, the methods described herein may in various embodiments be implemented by any combination of hardware and software. For example, the methods may be implemented by computer system 600 that includes one or more processors executing program instructions stored on a computer-readable storage medium coupled to the processors. The program instructions may be configured to implement the functionality described herein (e.g., the functionality of various servers and other components that implement the look-up component described herein). The various methods as illustrated in the figures and described herein represent example embodiments of methods. The order of any method may be changed, and various elements may be added, reordered, combined, omitted, or modified.

Computer system 600 includes one or more processors 610*a*-610*n* (any of which may include multiple cores, which may be single or multi-threaded) coupled to a system memory 620 via an input/output (I/O) interface 630. Computer system 600 further includes a network interface 640 coupled to I/O interface 630. In various embodiments, computer system 600 may be a uniprocessor system including one processor, or a multiprocessor system including several processors (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA. The computer system 600 also includes one or more network communication devices (e.g., network interface 640) for communicating with other systems and/or components over a communications network (e.g. Internet, LAN, etc.). For example, a client application executing on system 600 may use network interface 640 to communicate with a server application executing on a single server or on a cluster of servers that implement one or more of the components of the systems described herein. In another example, an instance of a server application executing on computer system 600 may use network interface 640 to communicate with other instances of the server application (or another server application) that may be implemented on other computer systems. Further, computer system 600, via I/O interface 630, may be coupled to one or more input/output devices 650, such as cursor control device 660, keyboard 670, camera device 690, and one or more displays 680.

In the illustrated embodiment, computer system 600 also includes one or more persistent storage devices and/or one or more I/O devices 650. In various embodiments, persistent storage devices may correspond to disk drives, tape drives, solid state memory, other mass storage devices, or any other persistent storage device. Computer system 600 (or a distributed application or operating system operating thereon) may store instructions and/or data in persistent storage devices, as desired, and may retrieve the stored instruction and/or data as needed. For example, in some embodiments, computer system 600 may host a storage system server node, and persistent storage may include the SSDs attached to that server node.

Computer system 600 includes one or more system memories 620 that are configured to store instructions and data accessible by processor(s) 610. In various embodiments, system memories 620 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 620 may contain program instructions 625 that are executable by processor(s) 610 to implement the methods and techniques described herein. In various embodiments, program instructions 625 may be encoded in platform native binary, any interpreted language such as Java™ byte-code, or in any other language such as C/C++, Java™, etc., or in any combination thereof. For example, in the illustrated embodiment, program instructions 625 include program instructions executable to implement the functionality of a database service, tracking-enabled client, update tracker, update listener, and/or update consumer in different embodiments. In some embodiments, program instructions 625 may implement multiple separate clients, server nodes, and/or other components.

In some embodiments, program instructions 625 may include instructions executable to implement an operating system (not shown), which may be any of various operating systems, such as UNIX, LINUX, Solaris™, MacOS™, Windows™, etc. Any or all of program instructions 625 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 600 via I/O interface 630. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 600 as system memory 620 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 640.

In some embodiments, system memory 620 may include data store 635, which may be configured as described herein. In general, system memory 620 (e.g., data store 635 within system memory 620), persistent storage, and/or remote storage may store data blocks, replicas of data blocks, metadata associated with data blocks and/or their state, configuration information, and/or any other information usable in implementing the methods and techniques described herein.

In one embodiment, I/O interface 630 may be configured to coordinate I/O traffic between processor(s) 610, system memory 620 and any peripheral devices in the system, including through network interface 640 or other peripheral interfaces. In some embodiments, I/O interface 630 may perform any necessary protocol, timing or other data transformations to convert data signals from one component (e.g., system memory 620) into a format suitable for use by another component (e.g., processor(s) 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments, some or all of the functionality of I/O interface 630, such as an interface to system memory 620, may be incorporated directly into processor(s) 610.

Network interface 640 may be configured to allow data to be exchanged between computer system 600 and other devices attached to a network, such as other computer systems (which may implement one or more storage system server nodes, database engine head nodes, and/or clients of the database systems described herein), for example. In addition, network interface 640 may be configured to allow communication between computer system 600 and various I/O devices 650 and/or remote storage. Input/output devices 650 may, in some embodiments, include one or more display terminals, keyboards, keypads, touchpads, scanning devices, voice or optical recognition devices, or any other devices suitable for entering or retrieving data by one or more computer systems 600. Multiple input/output devices 650 may be present in computer system 600 or may be distributed on various nodes of a distributed system that includes computer system 600. In some embodiments, similar input/output devices may be separate from computer system 600 and may interact with one or more nodes of a distributed system that includes computer system 600 through a wired or wireless connection, such as over network interface 640. Network interface 640 may commonly support one or more wireless networking protocols (e.g., Wi-Fi/IEEE 802.11, or another wireless networking standard). However, in various embodiments, network interface 640 may support communication via any suitable wired or wireless general data networks, such as other types of Ethernet networks, for example. Additionally, network interface 640 may support communication via telecommunications/telephony networks such as analog voice networks or digital fiber communications networks, via storage area networks such as Fibre Channel SANs, or via any other suitable type of network and/or protocol. In various embodiments, computer system 600 may include more, fewer, or different components than those illustrated (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system comprising:
   one or more hardware computing devices comprising one or more hardware processors and memory;
   a database storing one or more tables, wherein at least one of the tables includes a plurality of records that include respective lists of elements; and
   an update module implemented by the one or more hardware computing devices, wherein the update module is configured to:
   receive an update command that specifies an element and a record of the plurality of records;
   update, according to the update command, a list of elements for the specified record of the plurality of records;
   determine an operand set that includes one or more unique operands respectively mapped to one or more elements of the updated list of elements for the specified record of the plurality of records;
   apply a function to the one or more unique operands of the operand set to determine a function value such that a complementary function applied to the function value and a given operand indicates whether the given operand is included in the operand set; and
   update the specified record of the plurality of records to include the determined function value; and
   a query module implemented by the one or more hardware computing devices, wherein the query module is configured to:
   receive a query for which of the records of the plurality of records include a list of elements that includes an element specified in the query;
   determine a unique operand mapped to the element specified in the query;
   for the plurality of records in the table:
   apply the complementary function to the unique operand and to function values of the plurality of records in the table to determine which of the records in the table include a respective function value generated using the unique operand; and
   determine, based at least on which records in the table include function values generated using the unique operand, which of the plurality of records include a respective list of elements that includes the element specified in the query; and
   respond to the query with an indication of which of the plurality of records include a respective list of elements that includes the element specified in the query.

2. The system of claim 1, wherein the database is a NoSQL database that does not support direct queries of specific elements of record attribute values that include lists of elements.

3. The system of claim 1, wherein a database service comprises the database, the update module, and the query module, and wherein queries and update commands are received over a network from one or more remote client computing devices.

4. The system of claim 1, wherein the update module and the query module are implemented on a client computing device, and wherein the client computing device remotely accesses a database service that comprises the database storing the one or more tables.

5. A method comprising:
   performing by one or more computing devices comprising one or more hardware processors and memory:
   receiving an update command that specifies an element and specifies a list of elements of a record, wherein the record is one of a plurality of records in a table of a data store;
   updating the list of elements of the specified record of the plurality of records, wherein the specified record of the plurality of records includes a function value based at least in part on an operand set of one or more unique operands respectively mapped to one or more elements in the list of elements of the specified record;
   determining a unique operand mapped to the specified element;
   determining a function value such that a complementary function applied to the function value and to a given operand indicates whether the given operand is included in the operand set; and
   updating the specified record of the plurality of records to include the determined function value.

6. The method of claim 5, wherein individual ones of the one or more unique operands are, respective, individual, unique prime numbers, wherein the function comprises a multiplication operation, and wherein the complementary function comprises a modulo operation.

7. The method of claim 6, wherein the unique operand is included in the one or more unique operands of the operand set if the modulo operation of the function value by the unique operand results in no remainder based on the unique operand being a factor of the function value, and wherein the unique operand is not included in the one or more unique operands of the operand set if the modulo operation of the function value by the unique operand results in a remainder based on the unique operand not being a factor of the function value.

8. The method of claim 6,
wherein said updating comprises:
determining that the update command indicates an insertion of the specified element into the list of elements of the specified record of the plurality of records;
wherein said determining the unique operand comprises:
determining whether a mapping exists between the specified element and the unique operand; and
generating, if no mapping exists between the specified element and the unique operand, a unique operand to map to the specified element; and
wherein said determining the function value comprises:
multiplying, prior to said updating the specified record of the plurality of records to include the determined function value, the function value included in the specified record of the plurality of records by the unique operand, wherein the determined function value is a product of said multiplying.

9. The method of claim 6,
wherein said updating comprises:
determining that the update command indicates a deletion of the specified element from the list of elements of the record of the plurality of records; and
wherein said determining the function value comprises:
dividing, prior to said updating the specified record of the plurality of records to include the determined function value, the function value included in the specified record of the plurality of records by the unique operand, wherein the determined function value is a result of said dividing.

10. The method of claim 5, wherein a database comprises the plurality of records in the table, and wherein the database does not include an index for indexing into respective lists of elements of the plurality of records of the table.

11. A method comprising:
performing by one or more computing devices comprising one or more hardware processors and memory:
receiving a query on whether an element is included in a list of elements;
determining a function value for the list of elements, wherein the function value is based on applying a function to one or more unique operands respectively mapped to the elements in the list of elements;
determining a unique operand mapped to the element in the query;
applying a complementary function to the function value for the list of elements and to the unique operand mapped to the element in the query to determine whether the function value was generated using the unique operand mapped to the element in the query; and
responding, based on whether the function value was generated using the unique operand, to the query with an indication of whether the element in the query is included in the list of elements.

12. The method of claim 11, wherein the one or more unique operands comprise, respective, individual, unique prime numbers, wherein said applying the function comprises multiplying the one or more unique operands respectively mapped to the elements in the list of elements, and wherein said applying the complementary function comprises applying a modulo operation to the function value for the list of elements and to the unique operand mapped to the element in the query.

13. The method of claim 12, wherein the unique operand is included in the one or more unique operands if the modulo operation of the function value by the unique operand results in no remainder based on the unique operand being a factor of the function value, and wherein the unique operand is not included in the one or more unique operands if the modulo operation of the function value by the unique operand results in a remainder based on the unique operand not being a factor of the function value.

14. The method of claim 11, wherein said determining the unique operand further comprises:
determining whether a mapping index includes a mapping between the element in the query and an existing unique operand; and
determining the unique operand to be either (a) the existing unique operand mapped to the element in the mapping index if the mapping index includes the element or (b) a generated unique operand received from a software service providing successive unique operands if the mapping index does not include the element.

15. The method of claim 11, wherein the query is a first query, wherein the list of elements is included in a record of a data store, wherein the record is one of a plurality of records of a table, and wherein the method further comprises:
receiving a second query of which of the records of the plurality of records in the table include a respective list of elements that includes an element specified in the second query;
determining a unique operand mapped to the element specified in the second query;
for the plurality of records of the table:
applying the complementary function to the unique operand mapped to the element specified in the second query and to function values of the plurality of records in the table to determine which of the records in the table include a respective function value generated using the unique operand mapped to the element specified in the second query; and
determining, based at least on which of the records in the table include respective function values generated using the unique operand mapped to the element specified in the second query, which of the plurality of records in the table include a respective list of elements that includes the element specified in the second query; and
responding to the second query with an indication of which of the plurality of records include a respective list of elements include the element specified in the second query.

16. The method of claim 15, wherein, for the plurality of records of the table, the plurality of records of the table are requested in a batch.

17. The method of claim 15, wherein, for the plurality of records of the table, individual ones of the plurality of records of the table are requested individually.

18. The method of claim 15, wherein a database comprises the data store, and wherein no schema in the database includes an index of individual elements of the lists of elements of the plurality of records in the table.

19. The method of claim 18, wherein said determining a unique operand comprises:

accessing an index table of the database comprising mappings between unique operands and individual elements of the lists of elements of the plurality of records in the table, wherein the index table is not maintained by a client computing device accessing the database.

20. The method of claim 15, wherein said determining which of the records in the table include a respective list of elements that includes the element specified in the second query does not comprise analyzing individual elements of the respective lists of elements of the plurality of records in the table.

* * * * *